United States Patent Office 3,172,845
Patented Mar. 9, 1965

3,172,845
DISPOSAL OF WASTE PRODUCTS FROM THE AMMONIA/SODA PROCESS
George Hall Manning, Northwich, England, assignor to Imperial Chemical Industries Limited, London, England, a corporation of Great Britain
No Drawing. Filed Aug. 14, 1961, Ser. No. 131,098
Claims priority, application France, July 22, 1961, 868,744
3 Claims. (Cl. 210—46)

This invention relates to an improved method of disposing of waste products from the ammonia-soda process, in particular the waste liquors and solids that issue from the distillers. In the latter ammonium chloride liquors from another part of the process are heated with milk of lime in order to recover the ammonia. An equivalent amount of calcium chloride is formed at the same time and remains in solution together with any sodium chloride that has passed unchanged through the process. Mixed with and suspended in this solution of calcium chloride and sodium chloride are various insoluble calcium compounds for example aluminates and silicates, the carbonate and sulphate, and other insoluble materials introduced into the system via the lime.

The solution is also supersaturated with respect to sulphate ions due to the presence of unstable sulphate-containing complexes, and on cooling from the temperature of about 110° C. at which it leaves the distillers it deposits large amounts of calcium sulphate. Thus one aspect of the problem of disposing of these waste liquors and solids is to avoid scaling by calcium sulphate of the pipes, vessels and other plant which convey or store them.

Works operating the ammonia-soda process near to the sea or other large volumes of naturally-occurring water can dispose of waste liquors and solids with relatively few problems beyond that of avoiding scaling by calcium sulphate, but for inland works it is a serious problem to find a place in which or on which the magma of waste solids after separation from the bulk of the liquors can be deposited. Usually hundreds of acres of land have to be set aside, and by means of dams or earth converted into reservoirs for holding the magma; such lime-beds, as they are called, are a characteristic feature of many inland ammonia-soda works, and they lie for generations, useless and immovable, and only infinitesimally slowly drying out.

It is the magma of waste solids that presents the main problem since the clear liquors after being cooled and desupersaturated with respect to sulphate, and possibly carbonated to neutralise any unchanged calcium hydroxide, can usually be disposed of into rivers and other drainage systems without much trouble.

It is clear therefore that a method of disposing of the magma of waste solids that did not require the use of land would be of the utmost value, and such a method has been described in which the magma is pumped to the bottoms of borehole cavities formed in rock salt in the process of making brine by passing water down boreholes into the salt. The method, though promising, suffered from disadvantages connected with the deposition of scale on plant and in pipe-lines, particularly on the filters where the magma is separated from as much of the clear liquors as possible. Solubility relationships of the various forms of calcium sulphate do not fully account for the erratic and puzzling behaviour experienced when one attempts to desupersaturate the waste liquors and magmas on a large scale by cooling, which was the method employed. Cooling of the system does indeed lead to precipitation of forms of calcium sulphate and over relatively short periods, measured in a small number of weeks, the rate of precipitation of further quantities of calcium sulphate phases is not great enough to be objectionable. Over longer periods however the gradual build-up of a scale of calcium sulphate phases is such as to make the method, promising as it is in the short term, unworkable. With a continuously running ammonia-soda process, as is normal practice, any method of disposal of waste products cannot be other than itself continuous. Some improved method of desupersaturating the system was necessary therefore that would remove virtually all of it. The present invention is concerned with this improvement.

Sulphate equilibria in the magma of solids and liquor are complex. At one time it was believed that the possible solid phases were gypsum, $CaSO_4.2H_2O$, anhydrite, $CaSO_4$, and calcium sulphate subhydrate, $CaSO_4.xH_2O$, where $x$ lies between 0 and two-thirds, but during the work which led to the process of the invention it became clear that fresh magma normally contains anhydrite and not subhydrate. It was further disclosed that at temperatures above about 40° C. a complex solid phase, believed on the basis of X-ray crystallographic analysis to be a sulpho-aluminate $Ca_3(AlO_3)_2.CaSO_4.12H_2O$, is also present along with anhydrite. Another unexpected discovery was that fresh magma contains an unstable sulphate-bearing compound, so far unidentified but recognisable by certain lines on the X-ray diffraction pattern of magma solids and believed to be a second complex sulpho-aluminate. This compound is unstable over a wide range of temperature and decomposes to give calcium sulphate in solution fairly slowly, but faster than sulphate is removed by the formation of solid phases. Thus it is not until this compound has completely decomposed that the sulphate concentration can fall to the final equilibrium value.

The transition temperature between gypsum and anhydrite is about 40° C. in water, and 38°–40° C. in the magma liquors. Thus, above this temperature scale deposited on filters, pipelines and similar plant will be predominantly anhydrite with some $$Ca_3(AlO_3)_2.CaSO_4.12H_2O$$

whilst below it scale will be deposited mainly as gypsum but also with some $Ca_3(AlO_3)_2.CaSO_4.12H_2O$.

The present invention is based on the discovery that by seeding the magma with gypsum crystals a degree of desupersaturation can be achieved quickly enough to make possible the continued operation of filters and other plant connected with the disposal of the magma. One unexpected and surprising feature of this step is that desupersaturation can be achieved by seeding with gypsum at temperatures well above the transition point of gypsum/anhydrite, for example at 60°–65° C. where the solid phase is anhydrite. Another unexpected feature, surprising in view of the known slowness with which equilibria are reached in these systems, is the rapidity with which desupersaturation is achieved.

The method, as a whole, of disposing of the waste solids comprises the following stages of which stage (iii) is the improvement according to the present invention:

(i) The mixture of liquors and solids that issues from the distiller is settled to give a mud and a supernatant clear liquor.

(ii) The mud is separated and cooled by additions of water.

(iii) The cooled mud is seeded with gypsum to desupersaturate it in respect of calcium sulphate.

(iv) The cooled and desupersaturated mud is filtered and the filter cake washed with water and then if desired with saturated brine.

(v) The washed filter cake is slurried in saturated brine and pumped to the bottom of a borehole cavity.

The settling process is desirable in order to reduce as far as possible the volumes of waste products that have to be disposed of, also to remove as much calcium chloride as possible from them, and also to provide a source of calcium chloride if it should be desired to manufacture this by evaporation and crystallisation of the supernatant clear liquors. It is advisable to remove as much calcium chloride as possible from the waste products in order that as little as possible finds its way into the borehole, for though the latter is preferably worked out, and consequently not likely to be continuing source of new brine, some of its brine will be displaced upwards and outwards by the entry of the slurry of filter cake, and if it is to be used in the ammonia-soda or some other process it is desirable that it should be as little as possible contaminated with calcium chloride.

The mud is preferably cooled to 60°–65° C. by additions of water and then seeded with gypsum crystals. One convenient way of obtaining gypsum seed crystals is to mix a minor portion of the mud with an equal volume of saturated crude brine in a vessel with an average retention time of 2 to 5 minutes. The sulphate ion concentration of the crude brine is fairly high, as is the calcium ion concentration of the mud; consequently the solubility product of calcium sulphate is exceeded and large quantites of gypsum crystals are produced as a magma with the mud. This is then returned to the major portion of the mud, and the gypsum crystals act as seed crystals on which further quantities of gypsum are precipitated. In this way the cooled mud can reach euilibrium in a few hours even if unstirred.

The cooled and desupersaturated mud is thickened in a second settling stage and then filtered in order to remove from it as much dissolved calcium chloride as possible and to reduce its volume. The filter cake is washed with water to reduce still further the amount of calcium chloride, but it is undesirable to send water with the cake to the borehole cavity because such water would dissolve rock salt and thus enlarge the cavity beyond its safe worked-out size with a possible danger of collapse of overlying strata. Consequently it is advisable to displace with saturated brine any wash water left in the filter cake, since saturated brine passing into the cavity cannot dissolve further rock salt.

The filter cake after washing is slurried in saturated brine and pumped to the borehole cavity. Being desupersaturated in respect of sulphate and virtually free of calcium ions it has no significant interaction with the brine, nor does it scale pumps and pipes with gypsum, and by now being at or around ambient temperature it can exert no thermal effect in the cavity.

The invention is illustrated by the following example; the expression m.³p.t.a. means cubic metres per ton of soda ash produced.

*Example*

The mixture of liquors and solids leaving a distiller of the ammonia-soda process amounted to approximately 9 m.³p.t.a. (cubic metres per tone of soda ash produced or about 2376 gallons per long ton of soda ash produced) and this volume contained about 96 kg. (or about 211 pounds) of solids. It was settled to a volume of 2m.³ p.t.a. (cubic metres per ton of soda ash produced or about 528 gallons per long ton of soda ash produced) in a 45-foot diameter settler and the clear liquor separated, carbonated, clarified, cooled and then disposed of to a river. About 1.75 m.³p.t.a. (cubic metres per ton of soda ash produced or about 462 gallons per long ton of soda ash produced) of settled mud was cooled with approximately half its volume of river water to 60°–65° C., whilst the remaining 0.25 m.³ (or about 66 gallons) was mixed with an equal volume of crude, saturated brine and the mixture allowed to stand for 4 miuntes at 40°–45° C. before being returned to the main flow of mud. The whole was allowed to stand for 7 hours and then thickened in a second 45-foot settler to a volume of approximately 1.7 m.³p.t.a. (cubic metres per ton of soda ash produced or about 448 gallons per long ton of soda ash produced). The mud-retention time of about 2 hours in the second settler is sufficient to complete the desupersaturation process.

The mud was then filtered on a multi-disc rotary vacuum filter 8 feet in diameter and the filter cake, which contained about 25% by weight of solids, washed on the filter with water and then with crude, saturated brine. Finally it was slurried in more crude, saturated brine and the slurry, now at a temperature of 20°–25° C., pumped through a four-inch main to the bottom of a worked-out borehole cavity full of brine.

What is claimed is:
1. In a process for disposing of the effluent solids from the distillers of an ammonia-soda process by separating them in the form of a mud from their associated clear liquors, subsequently filtering and washing the mud and slurrying it in brine and conveying the slurry to the bottom of a brine borehole cavity, the improvement comprising cooling the mud to temperatures of 60 to 65° C. after separation from the clear liquors, and then desupersaturating it by seeding it with gypsum crystals at these temperatures before filtering, washing and slurrying it in brine, said gypsum seed crystals being provided by separating a minor portion of cooled mud, mixing it with approximately its own volume of saturated crude brine and returning the mixture after standing for about 5 minutes to the bulk of the cooled mud.

2. In a process for disposing of the effluent solids from the distillers of an ammonia-soda process by separating the effluent solids in the form of a mud from their associated clear liquors, subsequently filtering and washing the mud and slurrying it in brine and conveying the slurry to the bottom of a brine borehole cavity, the improvement comprising cooling the mud to temperatures within the range of 60–65° C. after separation from the clear liquors, separating a minor proportion of the cooled mud and mixing it with an approximately equal volume of saturated crude sodium chloride brine having a fairly high naturally-occurring sulphate ion concentration, returning the resulting mixture after standing for up to about 5 minutes to the major portion of the cooled mud, allowing the whole to stand and settle for several hours, and then filtering the mud and washing and slurrying the filter cake in saturated crude sodium chloride brine.

3. The process of claim 2 wherein the minor portion separated is cooled to temperatures within the range of 40 to 45° C. before being returned to the major portion of the mud.

References Cited by the Examiner

UNITED STATES PATENTS

| | | | |
|---|---|---|---|
| 1,399,845 | 12/21 | Bull | 23—122 X |
| 2,698,225 | 12/54 | Svanoe | 210—46 X |
| 2,856,074 | 10/58 | Dubitzky | 210—46 X |
| 2,979,442 | 4/61 | Badger | 210—46 X |
| 3,026,261 | 3/62 | Mayfield et al. | 210—46 X |

OTHER REFERENCES

Green: Ammonia-Soda Wastes and Their Disposal, Proc. Seventh Ind. Waste Conf., Purdue Univ., 1952, pp. 92–104.

Faust: Sludge Characteristics Resulting From Lime Neutralization of Dilute Sulfuric Acid Wastes, Proc. Thirteenth Ind. Waste Conf., Purdue Univ., 1958, pp. 270–285.

Selm et al.: Deep Well Disposal of Industrial Wastes, Proc. Fourteenth Ind. Waste Conf., Purdue Univ., 1959 pp. 566–586.

MORRIS O. WOLK, *Primary Examiner.*

EARL M. BERGERT, *Examiner.*